US011495042B1

(12) United States Patent
Lo et al.

(10) Patent No.: US 11,495,042 B1
(45) Date of Patent: Nov. 8, 2022

(54) VOLTAGE SENSING FINGERPRINT RECOGNITION DEVICE AND FINGERPRINT RECOGNITION METHOD THEREOF

(71) Applicant: Image Match Design Inc., Zhubei (TW)

(72) Inventors: Yen-Kuo Lo, Zhubei (TW); Yeh-Suan Yan, Zhubei (TW)

(73) Assignee: IMAGE MATCH DESIGN INC., Zhubei (TW)

( * ) Notice: Subject to any disclaimer, the term of this patent is extended or adjusted under 35 U.S.C. 154(b) by 0 days.

(21) Appl. No.: 17/315,467

(22) Filed: May 10, 2021

(51) Int. Cl.
*G06V 40/13* (2022.01)
*G06V 10/147* (2022.01)

(52) U.S. Cl.
CPC ........ *G06V 40/1306* (2022.01); *G06V 10/147* (2022.01)

(58) Field of Classification Search
CPC .......................... G06V 40/1306; G06V 10/147
See application file for complete search history.

(56) References Cited

U.S. PATENT DOCUMENTS

| 2018/0204037 | A1* | 7/2018 | Hargreaves | ........ G06V 40/1306 |
| 2019/0014274 | A1* | 1/2019 | Lin | ........................ G06V 10/147 |
| 2019/0147211 | A1* | 5/2019 | Shu | ..................... G06V 40/1306 382/124 |
| 2021/0097318 | A1* | 4/2021 | Chung | ................... H04N 5/378 |

* cited by examiner

*Primary Examiner* — Lixi C Simpson
(74) *Attorney, Agent, or Firm* — Muncy, Geissler, Olds & Lowe, P.C.

(57) ABSTRACT

The invention provides a voltage sensing fingerprint recognition device and a fingerprint recognition method thereof. The voltage sensing fingerprint recognition device includes: a sensor arranged on a substrate, and the sensor including a plurality of sensing pads, the sensing pads respectively arranged in a plurality of rows, and each row having at least two sensing pads, each sensing pad receiving a trigger voltage; and a voltage receiver, electrically connected to each sensing pad; when the voltage receiver captures one sensed voltage value of the sensing pads in any row, the sensing pads in the row stop receiving the trigger voltage. The present invention does not require an additional frame, so it is applied to the display surface of electronic products.

9 Claims, 13 Drawing Sheets

Provide a trigger voltage to a plurality of sensing pads, the sensing pads are arranged in a plurality of rows, each row has at least two sensing pads, and the sensing pads in each row are electrically connected to a voltage receiver When the voltage receiver captures at least one sensing voltage value in any row, the sensing pads in the row stop receiving the trigger voltage At least one sensing voltage value of the sensing pads in the row corresponds to the fingerprint shape on the sensing pads in the row

FIG.9

VOLTAGE SENSING FINGERPRINT RECOGNITION DEVICE AND FINGERPRINT RECOGNITION METHOD THEREOF

BACKGROUND OF THE INVENTION

Field of the Invention

The present invention relates to the field of fingerprint recognition, and particularly relates to a voltage sensing fingerprint recognition device and a fingerprint recognition method thereof.

Description of the Prior Art

The current active capacitive fingerprint recognition device requires an additional frame (such as an iron frame) to provide the sensing pads voltage. When a touch event occurs, the user's finger generates capacitance with the sensing pads, and then measure the voltage of sensing pads after touching for fingerprint recognition. However, when the above-mentioned fingerprint recognition device is attached to the display surface of an electronic product, the visibility of the display surface is reduced, thus restricting the fingerprint recognition device to be applied to a specific location of the electronic product, and the additional frame also increases the manufacturing cost of the fingerprint recognition device.

In view of the improvement of the above-mentioned prior art, the present inventor provides a voltage sensing fingerprint recognition device and a fingerprint recognition method thereof to solve the disadvantage of the conventional fingerprint recognition device.

SUMMARY OF THE INVENTION

The main purpose of the present invention is to provide a voltage sensing fingerprint recognition device that is applied to the display surface of electronic products without an additional frame.

Another object of the present invention is to provide a voltage sensing fingerprint recognition device and a fingerprint recognition method thereof, which enhances fingerprint detecting.

The present invention provides a voltage sensing fingerprint recognition device and a fingerprint recognition method thereof. The voltage sensing fingerprint recognition device of the present invention includes: a substrate; a sensor arranged on the substrate, the sensor including a plurality of sensing pads, the sensing pads arranged in a plurality of rows, and each row having at least two sensing pads, and each sensing pad receiving a trigger voltage; and a voltage receiver electrically connected to each sensing pad; when the voltage receiver captures a sensing voltage value of the sensing pads of any row, the sensing pads of the row stop receiving the trigger voltage.

In an embodiment of the voltage sensing fingerprint recognition device of the present invention, wherein the sensing pads in the adjacent rows of the sensing pads in the row also stop receiving the trigger voltage.

In an embodiment of the voltage sensing fingerprint recognition device of the present invention, wherein the sensing pads stopped receiving the trigger voltage further receive an enhanced trigger voltage.

In an embodiment of the voltage sensing fingerprint recognition device of the present invention, wherein when the trigger voltage is stopped, the enhanced trigger voltage is received at the same time, and the voltage values of the trigger voltage and the enhanced trigger voltage are positive and negative oppositely.

In an embodiment of the voltage sensing fingerprint recognition device of the present invention, wherein the voltage receiver includes a sample-and-hold circuit (S/H) or a double correlated sampling circuit (Correlated Double Sampling, CDS).

In an embodiment of the voltage sensing fingerprint recognition device of the present invention, further includes a dielectric layer encapsulated on the sensor.

The fingerprint recognition method of the voltage sensing fingerprint recognition device of the present invention includes the steps of: providing a trigger voltage to a plurality of sensing pads, the sensing pads arranged in a plurality of rows, and each row having at least two sensing pads, and the sensing pads in each row electrically connected to a voltage receiver; when the voltage receiver captures at least one sensing voltage value in any row, the sensing pads in the row stop receiving the trigger voltage; and at least one sensing voltage value of the sensing pads in the row corresponding to the fingerprint shape on the sensing pads in the row.

In an embodiment of the fingerprint recognition method of the voltage sensing fingerprint recognition device of the present invention, the neighboring sensing pads of the sensing pads whose sensing voltage values are stored, also stop receiving the trigger voltage.

In an embodiment of the fingerprint recognition method of the voltage sensing fingerprint recognition device of the present invention, wherein the sensing pads stopped receiving the trigger voltage further receive an enhanced trigger voltage.

In an embodiment of the fingerprint recognition method of the voltage sensing fingerprint recognition device of the present invention, wherein when the trigger voltage is stopped, the enhanced trigger voltage is received at the same time, and the voltage values of the trigger voltage and the enhanced trigger voltage are positive and negative oppositely.

Another voltage sensing fingerprint recognition device of the present invention includes: a substrate; a sensor arranged on the substrate, the sensor including a plurality of sensing pads, the sensing pads respectively arranged in a plurality of rows, and each row having at least two sensing pads, each of sensing pads synchronously or asynchronously receiving a trigger voltage and an enhanced trigger voltage; and a voltage receiver electrically connected to each sensing pad; when the voltage receiver captures a sensing voltage value of the sensing pads in any row, the sensing pads in the row stop receiving the trigger voltage and receive the enhanced trigger voltage, when the voltage receiver captures another sensing voltage value of the sensing pads in the row, the sensing pads in the row receive the trigger voltage and stop or receive the enhanced trigger voltage.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
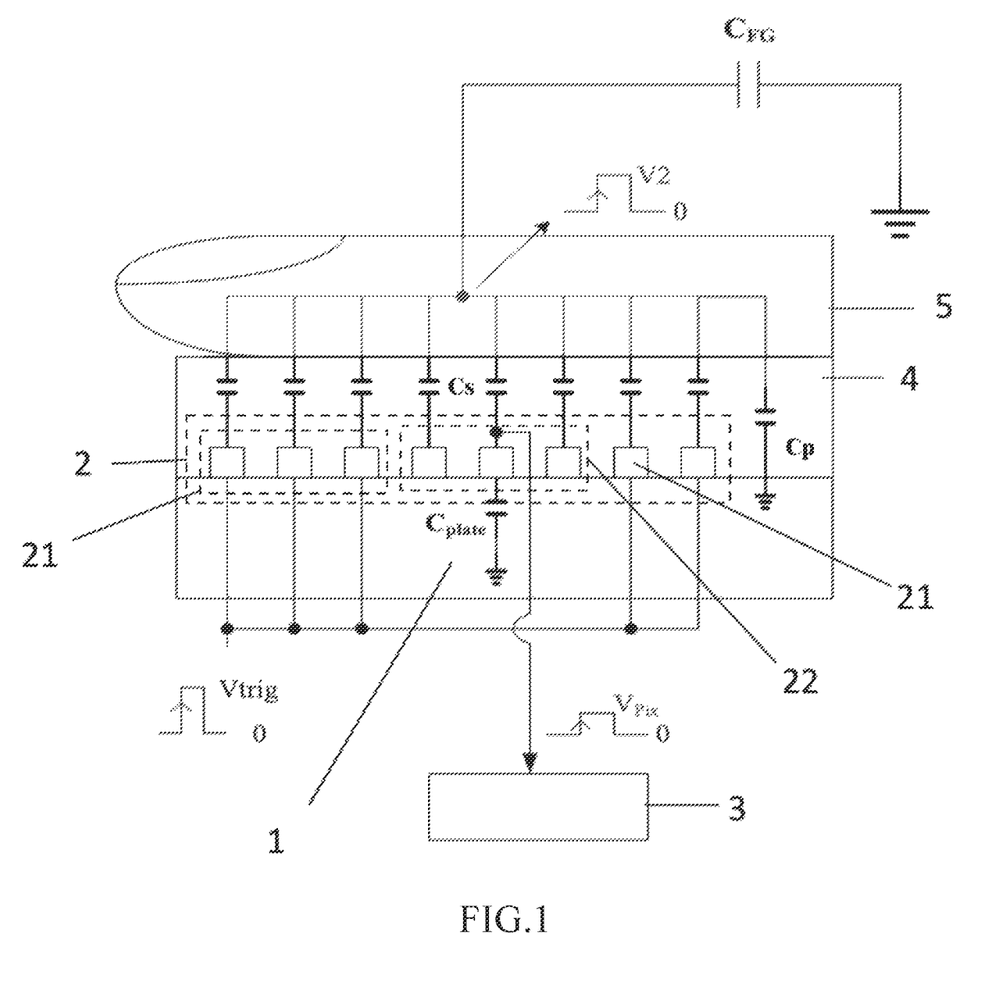
FIG. 1 is a schematic side view of an embodiment of a voltage sensing fingerprint recognition device of the present invention, when a finger touches thereon.
Figure 2:
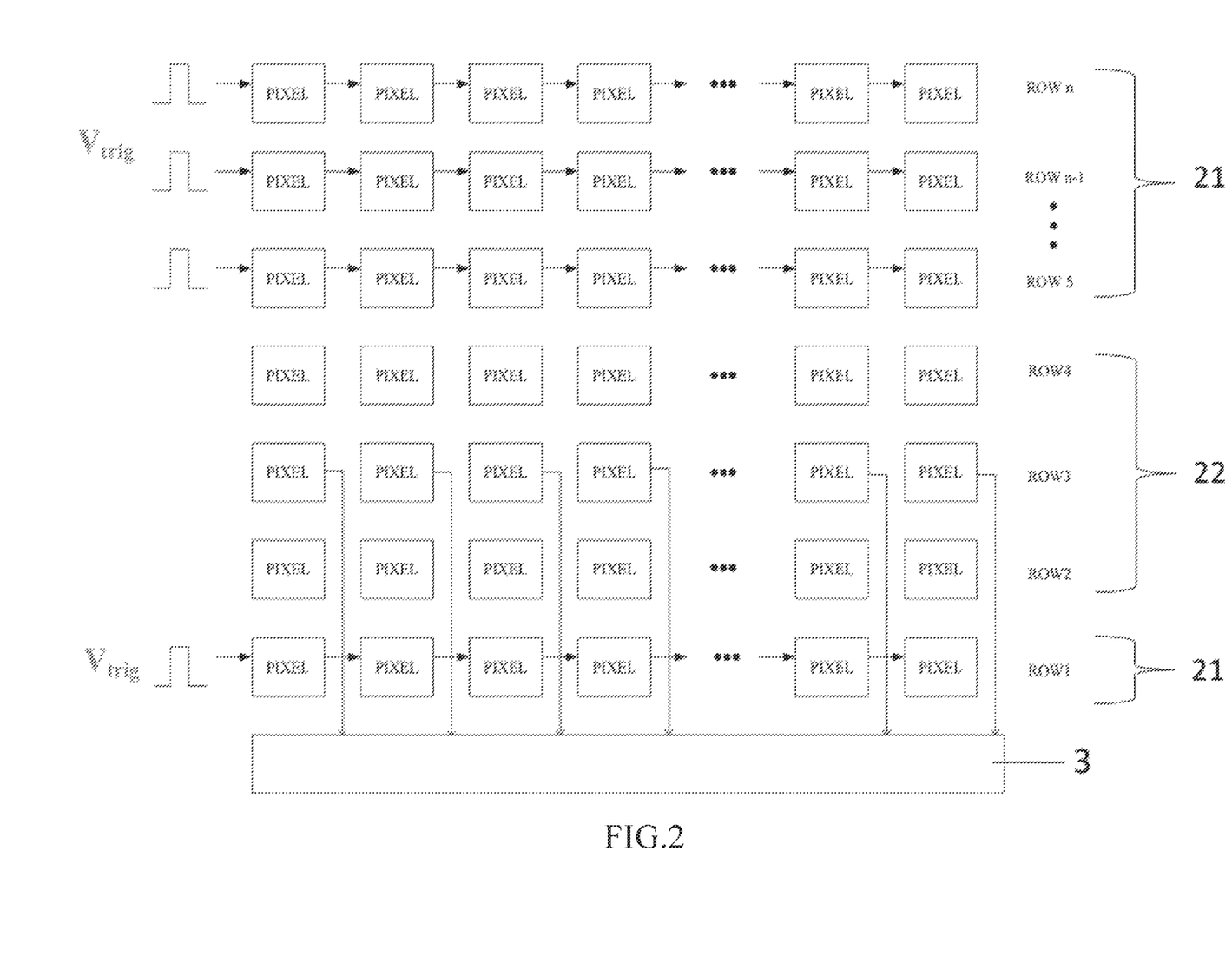
FIG. 2 is a top view driving schematic diagram of an embodiment of the voltage sensing fingerprint recognition device of the present invention.

Please refer to FIG. 1 and FIG. 2, an embodiment of the voltage sensing fingerprint recognition device of the present invention includes that: a substrate 1; a sensor 2 is arranged on the substrate 1, the sensor 2 includes a plurality of sensing pads (21, 22), the sensing pads (21, 22) are respectively arranged in a plurality of rows (ROW1~ROWn), and each row has at least two sensing pads, and each sensing pad receives a trigger voltage Vtrig (FIG. 2 only depicts the state of the trigger voltage Vtrig when it is applied to the sensing pad 21 at a certain time, in fact, the trigger voltage Vtrig is supplied to each row by changing over time); and a voltage receiver 3 is electrically connected to the sensing pads (21, 22) (in order to make the diagram concise and easy to describe, FIGS. 1 and 2 only show that the plurality of sensing pads 22 in the row ROW3 are electrically connected to the voltage receiver 3, in fact, the plurality of sensing pads (21, 22) in rows ROW1~ROWn are electrically connected to the voltage receiver 3 for accurate fingerprint sensing.); When the voltage receiver 3 captures a sensing voltage value Vpix of the sensing pads 22 in a first row (such as ROW3) of the plurality of rows (ROW1~ROWn), all of the sensing pads 22 of the first row (ROW3) stop receiving the trigger voltage Vtrig.

In addition, in order to enable the voltage receiver 3 to capture the sensing voltage value Vpix of sensing pads of each row without interference, in this embodiment, the first row (ROW3) is arranged between two second rows (ROW2 and ROW4) of the plurality of rows, and all of the sensing pads 22 in the two second rows (ROW2 and ROW4) also stop receiving the trigger voltage Vtrig, so that the interference of the trigger voltage Vtrig on the sensing pads 21 of row ROW1 and row ROW5 is avoided, so as to measure the sensing voltage value Vpix of sensing pads of each row more accurately and recognize the fingerprint on the sensing pads of each row.

In addition, the sensing pads (21, 22) are composed of a plurality of sensing pixels PIXEL. In this embodiment, the trigger voltage Vtrig is provided to a plurality of rows of different regions of the sensor 2 in a time-sharing and sequential manner (similar to a scanning manner). For example, the trigger voltage Vtrig is provided in the partial row (ROW1 and ROW5~ROWn) in the aforementioned manner, the other partial row (ROW2~ROW4) stops providing voltage, voltage receiver 3 is used to capture and store the sensing voltage value Vpix of the plurality of sensing pads 22 of the middle row (ROW3) of the other partial row (ROW2~ROW4) when touching, and then the trigger voltage Vtrig is provided to the partial row (ROW1~ROW2 and ROW6~ROWn), and the other partial row (ROW3~ROW5) stops providing voltage, and then the voltage receiver 3 is used to capture and store the sensing voltage value Vpix of the plurality of sensing pads 22 of the middle row (ROW4) of the other partial row (ROW3~ROW5) when touching, and so on, whereby the sensing voltage value Vpix on sensing pads of each row is detected, and the fingerprint on sensing pads of each row is recognized.

The voltage receiver 3 includes a sample-and-hold circuit (S/H) or a double correlated sampling circuit (Correlated Double Sampling, CDS). In addition, a dielectric layer 4 is encapsulated on the sensor 2.

Please refer to FIGS. 1 to 3 again. After the sensing pad 21 receives the trigger voltage Vtrig, when touching, a sensing capacitance Cs is generated between a finger 5 and the sensing pad 22 in the row ROW3, and is a capacitance Cplate between the sensing pad 22 and the substrate 1, and another capacitance Cp is generated between the finger 5 and the substrate 1, and a finger capacitance $C_{FG}$ and a finger voltage V2 are generated. In addition, the sensing voltage value Vpix of the sensing pad 22 in row ROW3 is captured and stored by the voltage receiver 3, and the change in the sensing voltage value Vpix obtained is used to determine the touch event happening and sensing the fingerprint.

Figure 3:
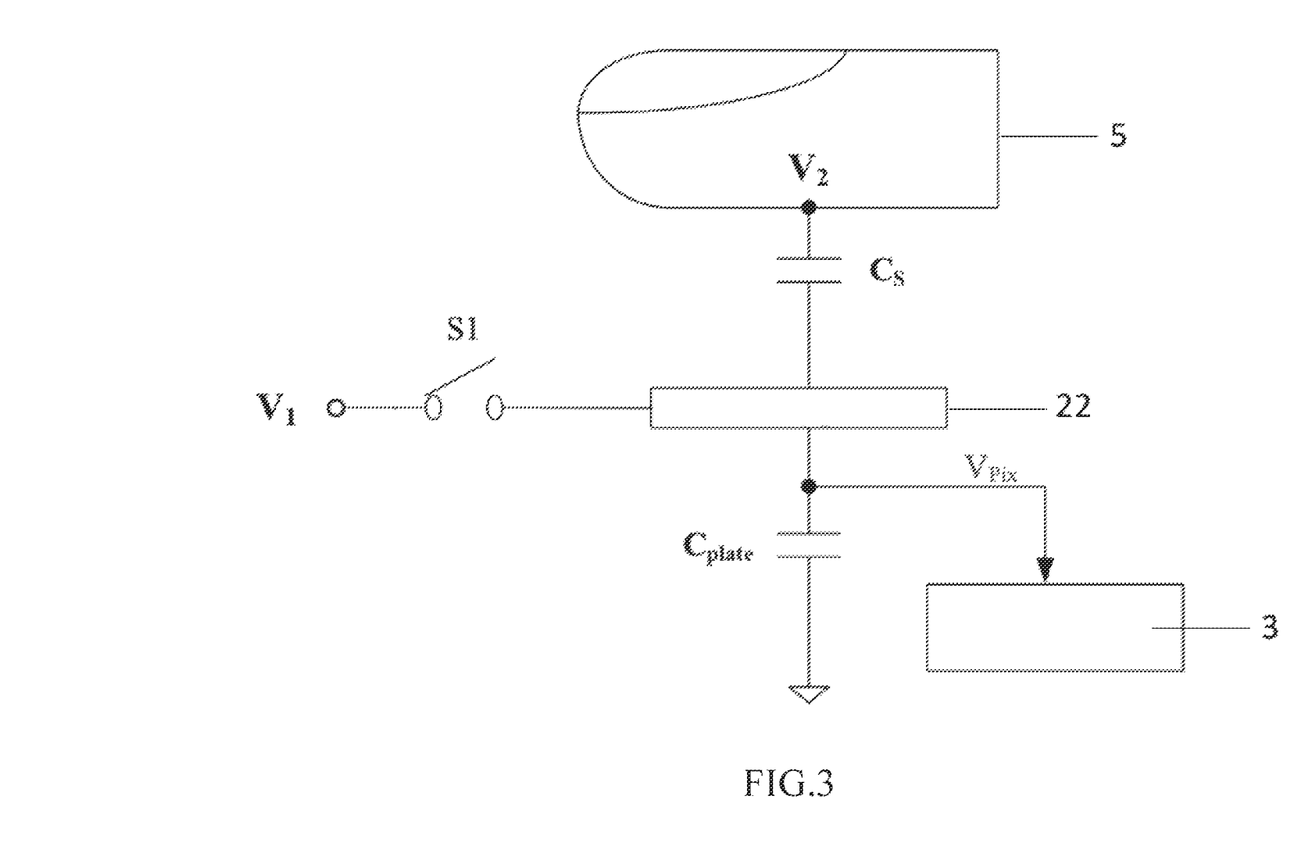
FIG. 3 is an embodiment of the voltage sensing fingerprint recognition device of the present invention, a schematic diagram of the circuit when a finger touches the sensing pad.

The relationship between the above voltages and capacitances are as follows, wherein Cs_total is a sensed total capacitance of the sensed capacitance Cs:

$$V_2 = \frac{C_{S\_total}}{C_{S\_total} + C_{FG} + C_P} \cdot V_{trig} \quad (1)$$

$$V_{pix} = \frac{C_S}{C_S + C_{plate}} \cdot V_2 \quad (2)$$

Figure 4A:
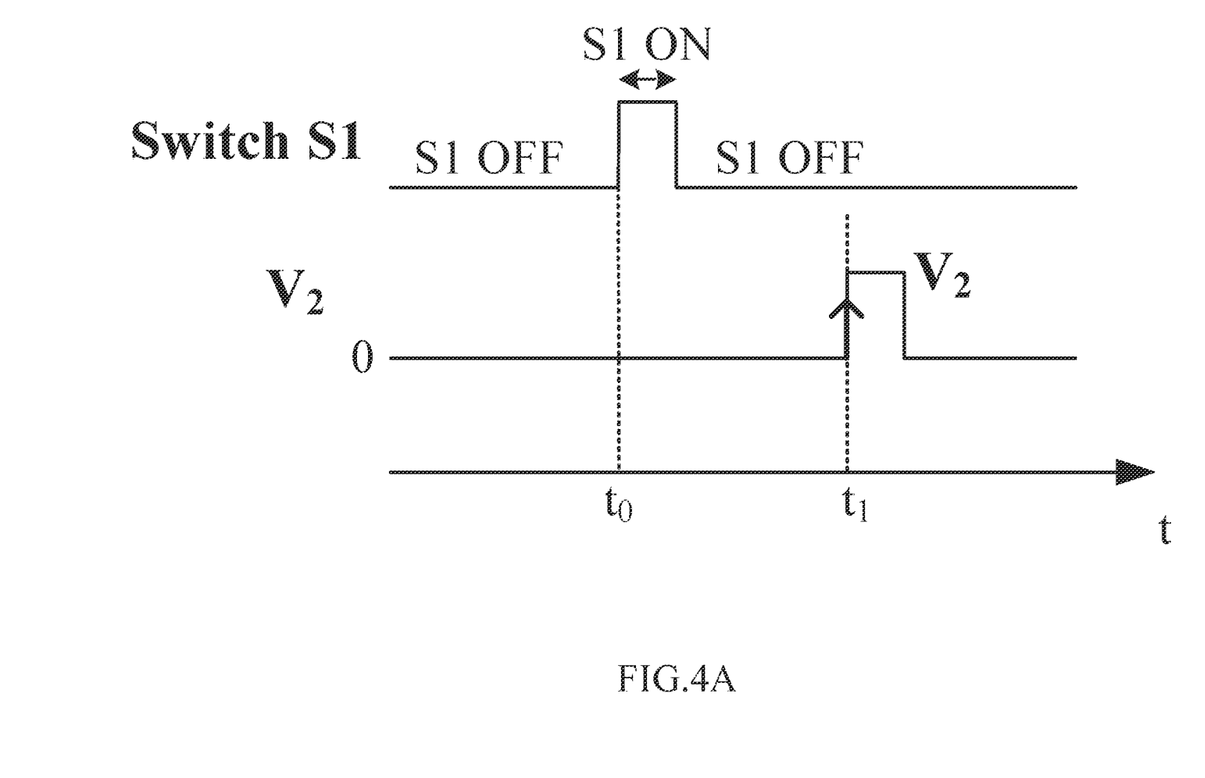
FIG. 4A is a timing waveform diagram of a driving method of the schematic circuit diagram of FIG. 3.
Figure 4B:
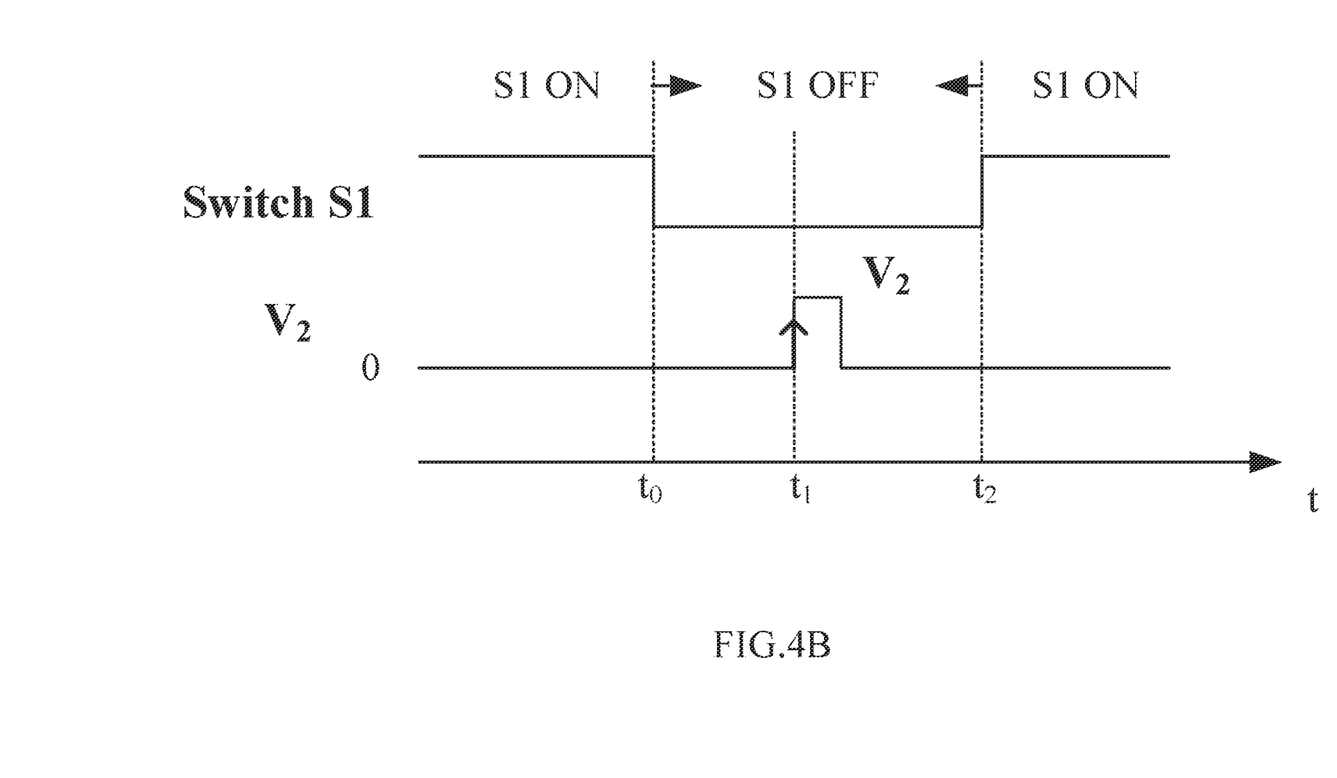
FIG. 4B is a timing waveform diagram of another driving method for the circuit diagram of FIG. 3.

Please refer to FIG. 2, FIG. 3, FIG. 4A and FIG. 4B again. FIG. 4A is a timing waveform diagram of a driving method of the schematic circuit diagram of FIG. 3. FIG. 4A shows that before collection of the sensing voltage of the sensing pad 22 in the row ROW3, a phase reset action is required to remove the residual charge of the time-sharing drive. FIG. 4A shows that in the initial state, the switch S1 is turned off (OFF), and the second sensing pad 22 in the row ROW3 is floating; at time $t_0$, the switch S1 is turned on (ON) to provide the DC voltage V1 to the sensing pad 22 in the row ROW3 for resetting, and then the switch S1 is turned off (OFF). At time $t_1$, the trigger voltage Vtrig (not shown) is coupled to the finger 5 to generate the finger voltage V2. FIG. 4B is a timing waveform diagram of another driving method for the circuit diagram of FIG. 3, FIG. 4B shows in the initial state, the switch S1 is turned on (ON), the sensing pad 22 of the row ROW3 is applied with the DC voltage V1, and the switch S1 is in time to is turned off (OFF) and turned on again at time $t_2$. The finger voltage V2 is generated at time $t_1$, and the switch S1 is turned off at this time.

In addition, FIG. 5 to FIG. 8C disclose another embodiment of the voltage sensing fingerprint recognition device of the present invention. The difference from the previous embodiment is that the sensing pads (21, 22) of each row (ROW1~ROWn) in this embodiment further receive an enhanced trigger voltage Vtrig_BT, thereby enhancing fingerprint sensing. Furthermore, the sensing pads 22 of the row (ROW3) stopped receiving the trigger voltage Vtrig further receive the enhanced trigger voltage Vtrig_BT (see FIG. 6 and FIGS. 8A to 8C), and the voltage values of the trigger voltage Vtrig and the enhanced trigger voltage Vtrig_BT are positive and negative oppositely.

Please refer to FIGS. 5 to 8C again. In more detail, a voltage sensing fingerprint recognition device according to another embodiment of the present invention includes that: the substrate 1; the sensor 2 is disposed on the substrate 1, the sensor 2 includes a plurality of sensing pads (21, 22), the sensing pads (21, 22) are respectively arranged in a plurality of rows (ROW1~ROWn), and each row has at least two sensing pads, each sensing pad receives the trigger voltage Vtrig and the enhanced trigger voltage Vtrig_BT synchronously (see FIG. 8A) or asynchronously (see FIGS. 8B and 8C); and the voltage receiver 3 is electrically connected to each sensor pads (21, 22) (In order to make the diagrams concise and easy to describe, FIGS. 5 and 6 only show that the plurality of sensing pads 22 in the row ROW3 are electrically connected to the voltage receiver 3. In fact, the plurality of sensing pads (21, 22) in the ROW1~ROWn are all electrically connected to the voltage receiver 3 for accurate fingerprint sensing.); when the voltage receiver 3 captures a sensing voltage value Vpix of the sensing pad 22 of any row (such as ROW3), the sensing pads 22 of the row (ROW3) stop receiving the trigger voltage Vtrig and receive the enhanced trigger voltage Vtrig_BT (Please see the schematic diagram of the first sample-and-hold circuit S/H1 in FIGS. 8A~8C); When the voltage receiver 3 captures another sensing voltage value Vpix of the sensing pads 22 of the row (ROW3), the sensing pads 22 of the row (ROW3) receive the trigger voltage Vtrig (Please see the schematic diagram of the second sample-and-hold circuit S/H2 in FIGS. 8A~8C), and stop (Please see the schematic diagram of the second sample-and-hold circuit S/H2 in FIG. 8A) or receive the enhance trigger voltage Vtrig_BT (Please see the schematic diagram of the second sample-and-hold circuit S/H2 in FIGS. 8B and 8C).

Figure 5:
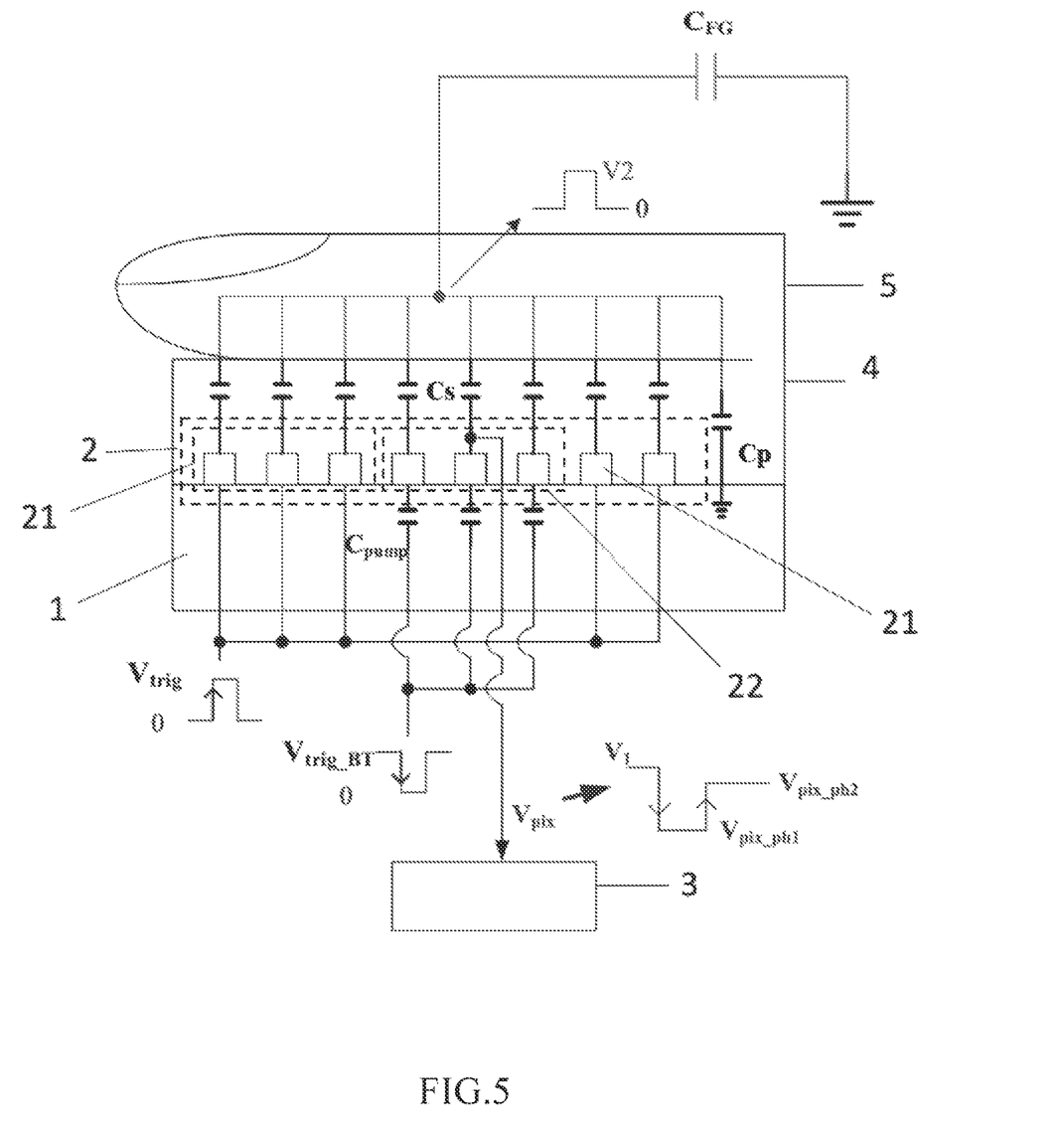
FIG. 5 is a schematic side view of another embodiment of the voltage sensing fingerprint recognition device of the present invention, when a finger touches thereon.
Figure 6:
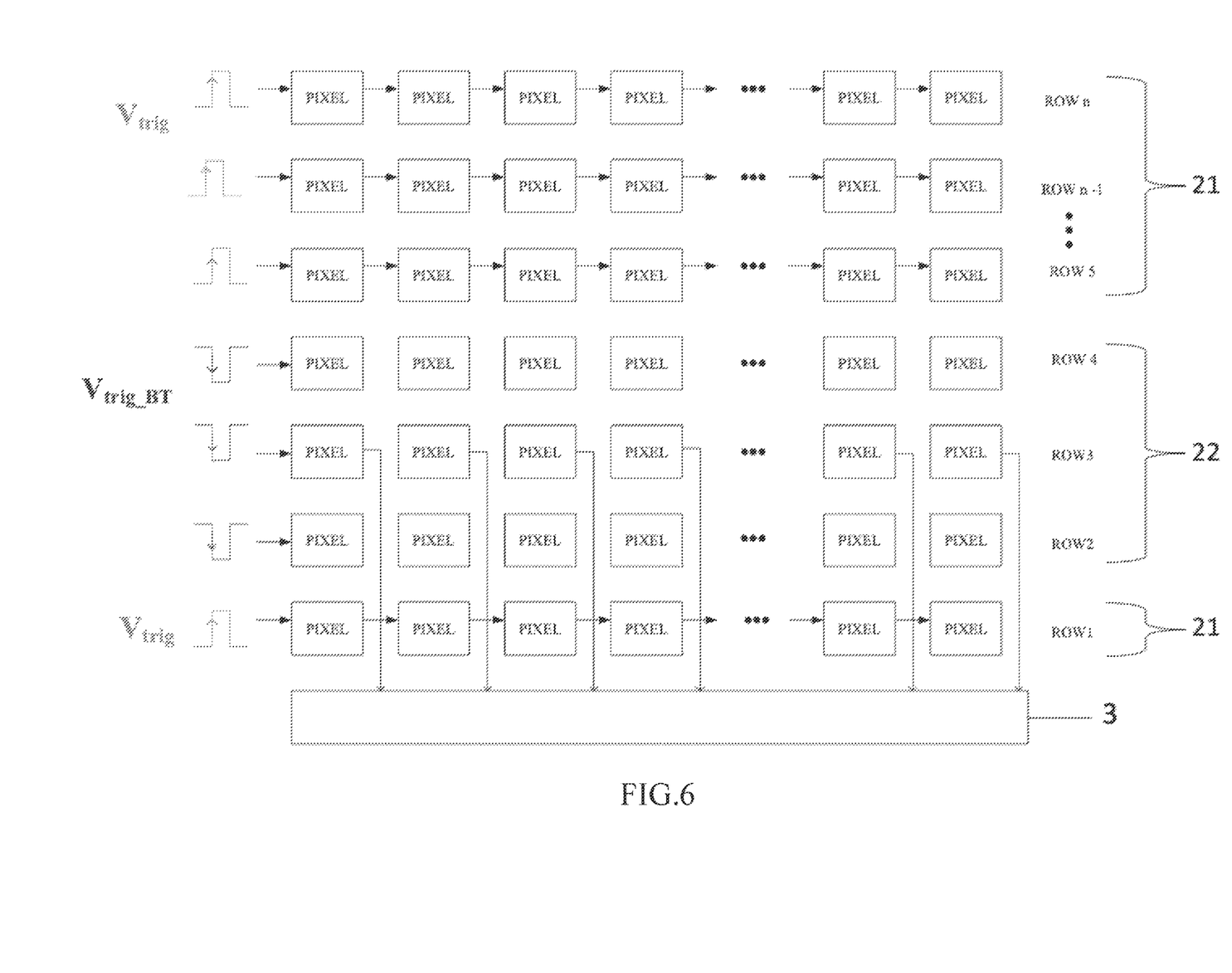
FIG. 6 is a top view driving schematic diagram of another embodiment of the voltage sensing fingerprint recognition device of the present invention.
Figure 7A:
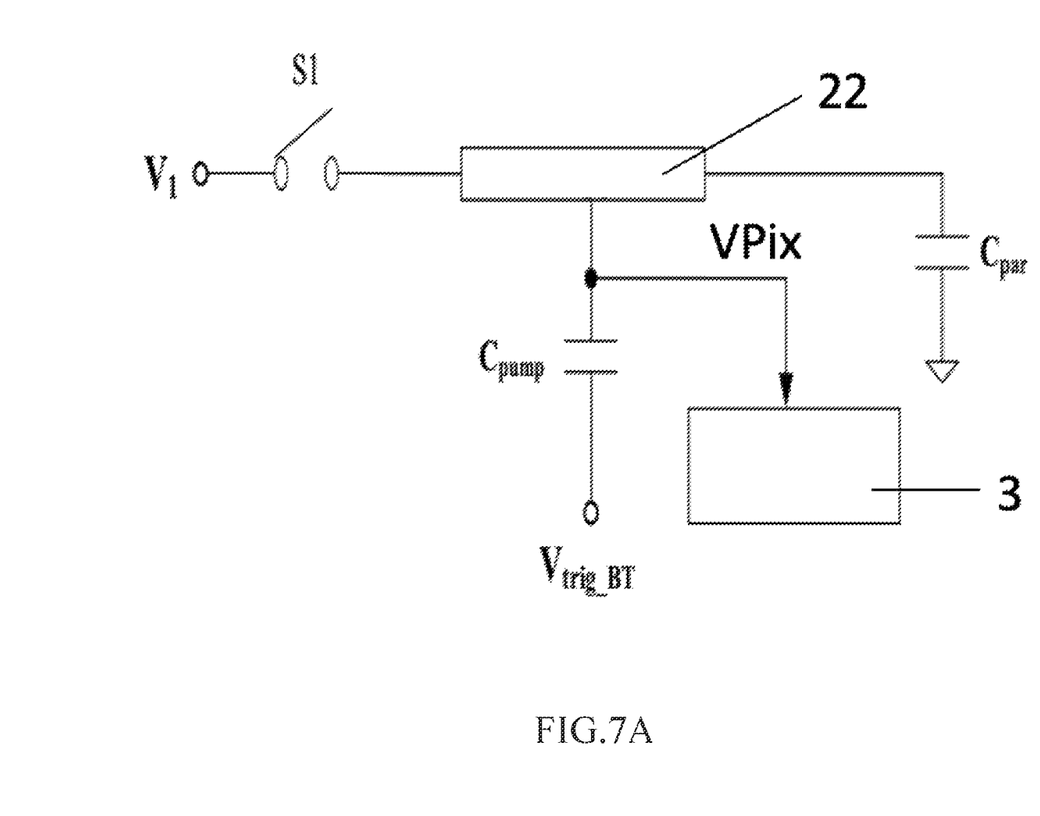
FIG. 7A is a schematic circuit diagram of a sensing pad of another embodiment of the voltage sensing fingerprint recognition device of the present invention.
Figure 7B:
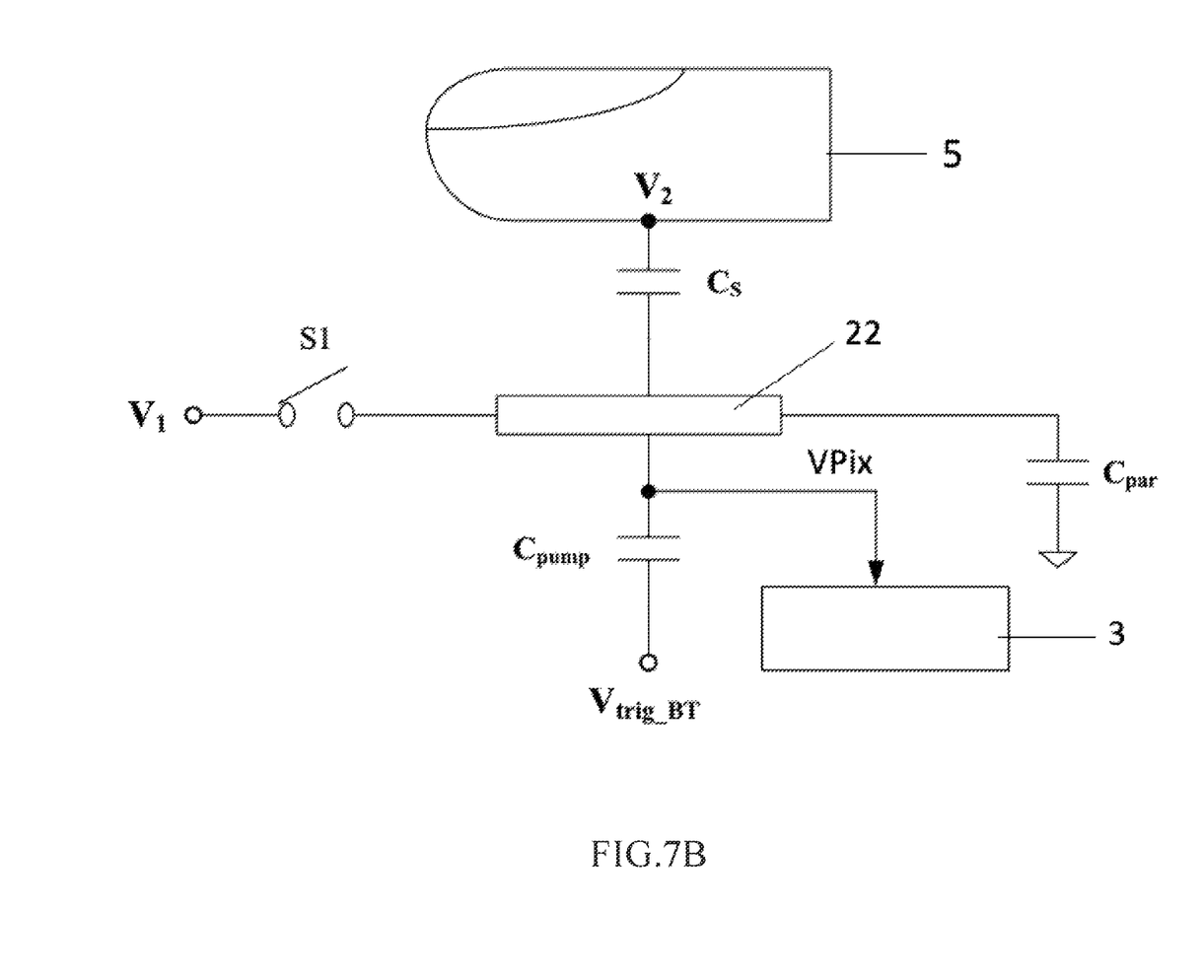
FIG. 7B is a schematic circuit diagram of another embodiment of the voltage sensing fingerprint recognition device of the present invention, when a finger touches the sensing pad.

Please refer to FIG. 5, FIG. 6, FIGS. 7A and 7B, the enhanced trigger voltage Vtrig_BT is applied to the sensing pad 22 to generate an enhanced trigger capacitor Cpump, and refer to FIGS. 7A and 7B, wherein the sensing pad 22 in the row ROW3 has a parasitic capacitance Cpar between the sensing pad 22 and the substrate 1.

Figure 8A:
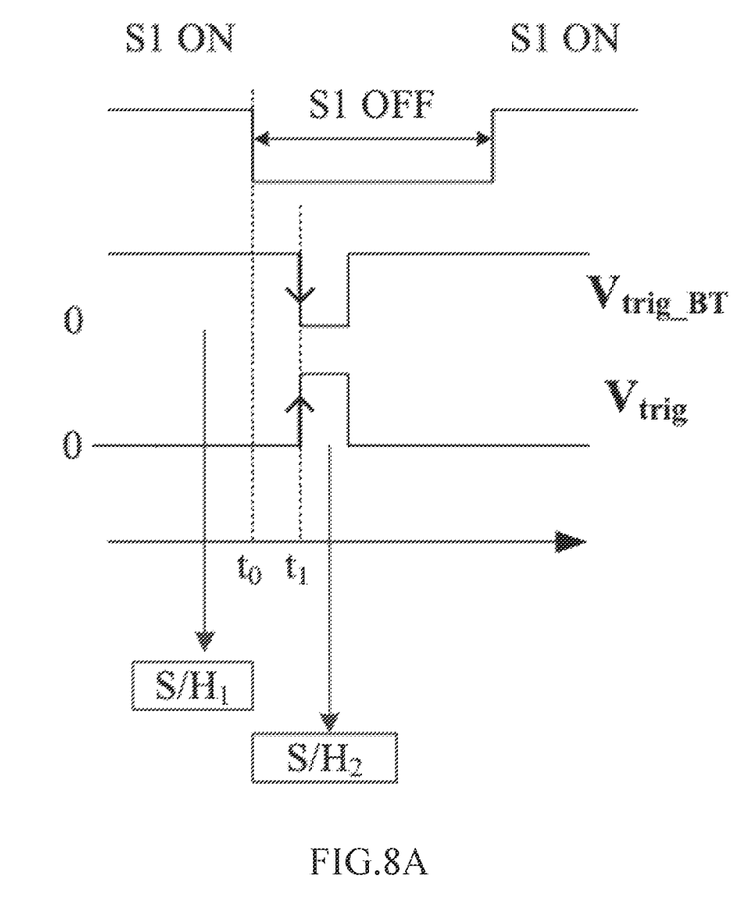
FIG. 8A is a synchronous driving timing waveform diagram of the circuit diagrams of FIGS. 7A and 7B.
Figure 8B:
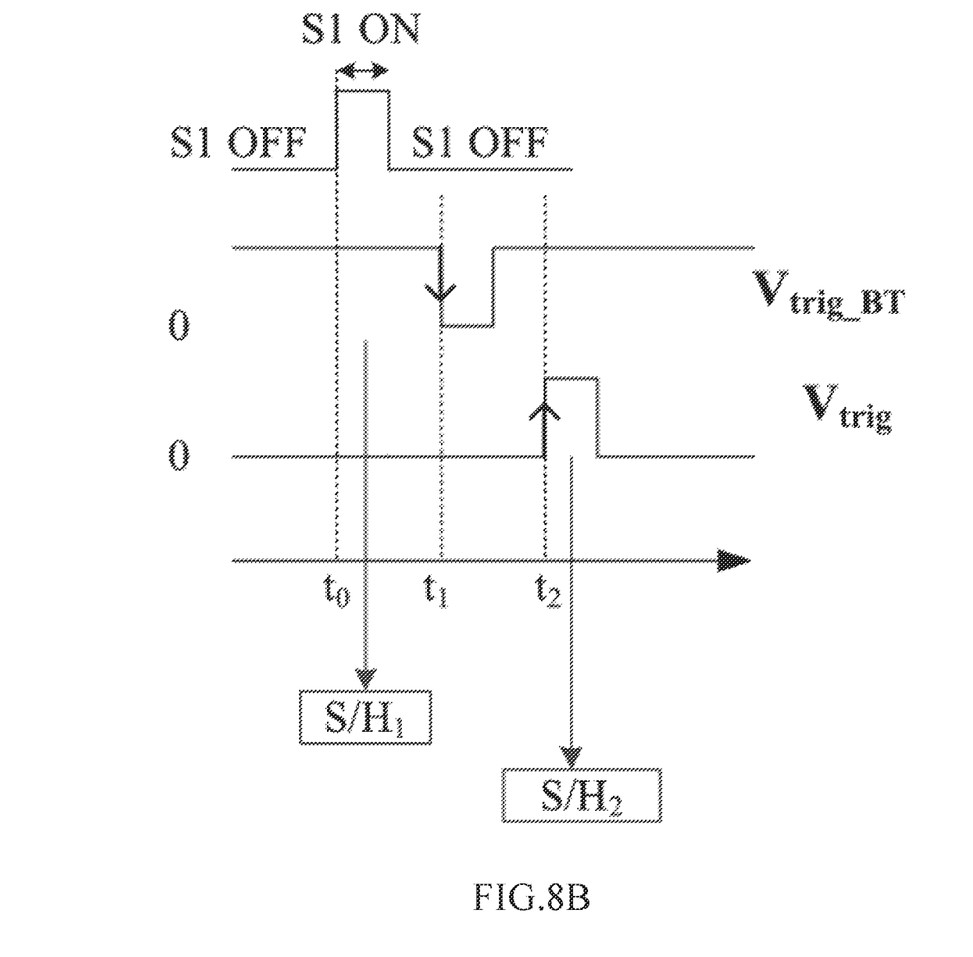
FIG. 8B is an asynchronous driving timing waveform diagram of the circuit diagrams of FIGS. 7A and 7B.
Figure 8C:
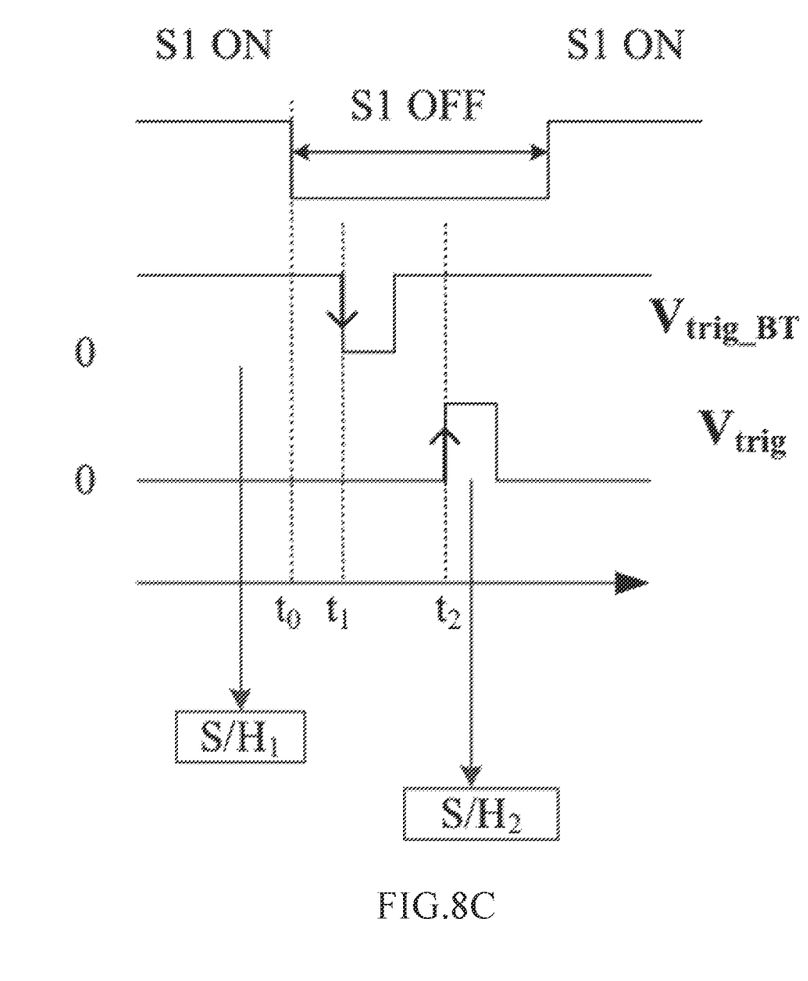
FIG. 8C is another asynchronous driving timing waveform diagram of the circuit diagrams of FIGS. 7A and 7B.

FIG. 8A is a synchronous driving timing waveform diagram of the circuit diagrams of FIGS. 7A and 7B, FIG. 8B is an asynchronous driving timing waveform diagram of the circuit diagrams of FIGS. 7A and 7B. FIG. 8C is another asynchronous driving timing waveform diagram of the circuit diagrams of FIGS. 7A and 7B. In FIG. 8A, the peaks of the enhanced trigger voltage Vtrig_BT and the trigger voltage Vtrig are simultaneously transmitted at the same time, so the enhanced trigger voltage Vtrig_BT and the trigger voltage Vtrig are driven synchronously. In FIGS. 8B and 8C, the peaks of the enhanced trigger voltage Vtrig_BT and the trigger voltage Vtrig are transmitted at different times, so the enhanced trigger voltage Vtrig_BT and the trigger voltage Vtrig are driven asynchronously.

In FIG. 7A, the finger 5 is not placed on the sensing pad 22 in the row ROW3. With the synchronous driving of FIG. 8A as an example, the switch S1 is closed first, and the sensing pad 22 in the row ROW3 applied with a DC voltage V1 is reset and then disconnected to remove residual charge. After that, the enhanced trigger voltage Vtrig_BT and the trigger voltage Vtrig are simultaneously transmitted at time $t_1$, and the sensing voltages Vpix at different times are stored in a first sample-and-hold circuit S/H1 and a second sample-and-hold circuit S/H2. At this time, the voltage receiver 3 of FIG. 5 is composed of the first sample-and-hold circuit S/H1 and the second sample-and-hold circuit S/H2.

As an example of synchronous driving as shown in FIG. 7A and FIG. 8A, when the finger 5 is not placed on the sensing pad 22 in the row ROW3, the first sample-and-hold circuit S/H1 and the second sample-and-hold circuit S/H2 capture the first phase sensing voltage Vpix_ph1 and the second phase sensing voltage Vpix_ph2 (not shown) respectively, and the relationship of the both, the related voltages and capacitances are as follows:

$$\text{When the switch } S1 \text{ is turned on, } V_{pix\_ph1} = V_1 \qquad (3)$$

$$V_{pix\_ph2} = V_1 - \frac{c_{pump}}{c_{pump} + c_{par}} \cdot V_{trig\_BT} = V_1 - V_{trig\_BT} \qquad (4)$$

The formula (4) is if the parasitic capacitance Cpar is small, $$\frac{c_{pump}}{c_{pump} + c_{par}}$$

close to 1.

As an example of synchronous driving as shown in FIG. 7B and FIG. 8A, when the finger 5 is placed on the sensing pad 22 in the row ROW3, the relationship between the above-mentioned voltages and capacitances are as follows:

$$\text{When switch } S1 \text{ is turned on, } V_{pix\_ph1} = V_1 \qquad (5)$$

$$V_{pix\_ph1} = V_1 - \frac{c_{pump}}{c_{pump} + c_{par} + c_s} \cdot V_{trig\_BT} + \frac{c_s}{c_{pump} + c_s + c_{par}} \cdot V_2 \qquad (6)$$

$$V_{pix\_ph2} - V_{pix\_ph1} = \frac{c_{pump}}{c_{pump} + c_{par} + c_s} \cdot V_{trig\_BT} + \frac{c_s}{c_{pump} + c_s + c_{par}} \cdot V_2 \qquad (7)$$

Formula (7) represents when the finger touching, $\Delta V_{pix}$ depends $$\frac{c_{pump}}{c_{pump} + c_{par} + c_s}.$$

$V_{trig\_BT}$ is increased, that is, the enhanced trigger voltage Vtrig_BT increases the sensing voltage Vpix, so the fingerprint recognition effect of sensing pads 22 in each row is enhanced.

Figure 9:
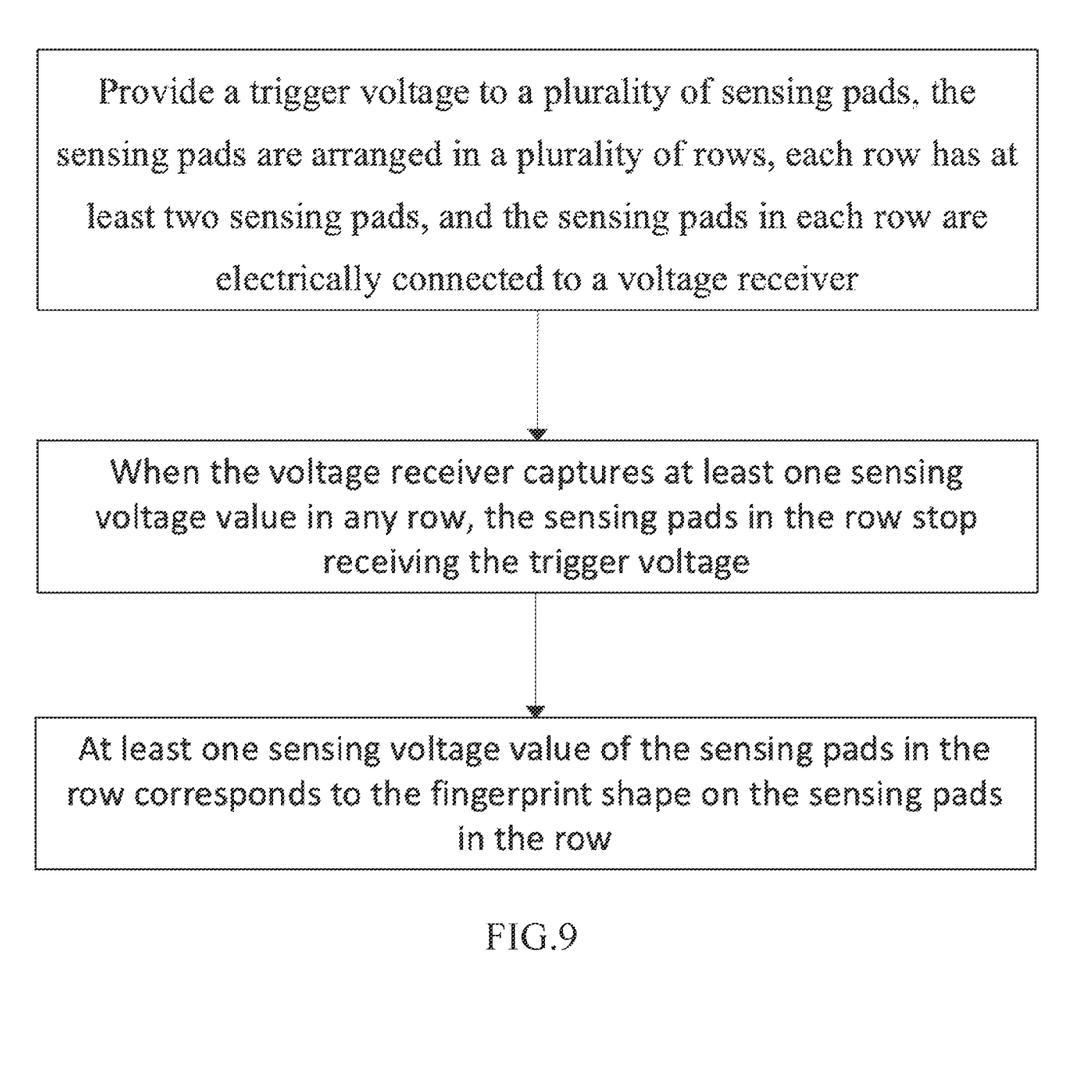
FIG. 9 is a flowchart of an embodiment of a fingerprint recognition method of a voltage sensing fingerprint recognition device of the present invention.

Please refer to FIG. 1, FIG. 2 and FIG. 9, an embodiment of the fingerprint recognition method of the voltage sensing fingerprint recognition device of the present invention, includes the steps of:

Step 1: Providing a trigger voltage Vtrig to the plurality of sensing pads (21, 22), the sensing pads (21, 22) arranged in a plurality of rows (ROW1~ROWn), each row having at least two sensing pads, and the sensing pads (21, 22) in the row electrically connected to a voltage receiver 3;

Step 2: When the voltage receiver 3 captures the sensing voltage values Vpix of the sensing pads in any row, the sensing pads 22 of the row (such as ROW3) stop receiving the trigger voltage Vtrig; and Step 3: The sensing voltage values Vpix of the sensing pads 22 of the row (ROW3) corresponding to the shape of the fingerprint on the row (ROW3).

The adjacent sensing pads (such as ROW2 and ROW4) of the sensing pads 22 of the row (ROW3) whose the sensing voltage values Vpix are captured, also stop receiving the trigger voltage Vtrig. In addition, the sensing pads (such as ROW2~ROW4) stopped receiving the trigger voltage Vtrig, as shown in FIG. 6, further receive an enhanced trigger voltage Vtrig_BT, and the voltage values of the trigger voltage Vtrig and the enhanced trigger voltage Vtrig_BT are positive and negative oppositely.

In summary, the voltage sensing fingerprint recognition device and fingerprint recognition method of the present invention do not require an additional frame, it is applied to the display surface of electronic products, and enhances the effect of fingerprint recognition.

Although the present invention is disclosed in the above embodiments, it is not intended to limit the present invention. Anyone with ordinary knowledge in the technical field makes some changes without departing from the spirit and scope of the present invention. Therefore, the scope of protection of the present invention shall be subject to the scope of the claims.

What is claimed is:

1. A voltage sensing fingerprint recognition device, comprising:
   a substrate;
   a sensor arranged on the substrate, the sensor including a plurality of sensing pads, the sensing pads respectively arranged in a plurality of rows, and each row has at least two sensing pads, each sensing pad receiving a trigger voltage; and
   a voltage receiver, electrically connected to each sensing pad;
   wherein when the voltage receiver captures at least one sensing voltage value of the sensing pads in a first row of the plurality of rows, all of the sensing pads in the first row stop receiving the trigger voltage;
   wherein the first row is arranged between two second rows of the plurality of rows, and all of the sensing pads in the two second rows also stop receiving the trigger voltage.

2. The voltage sensing fingerprint recognition device according to claim 1, wherein the sensing pads stopped receiving the trigger voltage further receive an enhanced trigger voltage.

3. The voltage sensing fingerprint recognition device according to claim 2, wherein when the trigger voltage is stopped, the enhanced trigger voltage is received at the same time, and the voltage values of the trigger voltage and the enhanced trigger voltage are positive and negative oppositely.

4. The voltage sensing fingerprint recognition device according to claim 1, wherein the voltage receiver includes a sample-and-hold circuit (S/H) or a double correlated sampling circuit (Correlated Double Sampling, CDS).

5. The voltage sensing fingerprint recognition device according to claim 1, further comprising a dielectric layer encapsulated on the sensor.

6. A fingerprint recognition method of a voltage sensing fingerprint recognition device, including the steps of:
   providing a trigger voltage to a plurality of sensing pads, the sensing pads arranged in a plurality of rows, each row having at least two sensing pads, and the sensing pads in each row electrically connected to a voltage receiver;
   when the voltage receiver captures at least one sensing voltage value of the sensing pads in a first row of the plurality of rows, all of the sensing pads in the first row stop receiving the trigger voltage; and
   at least one sensing voltage value of the sensing pads in the first row corresponding to the fingerprint shape on the sensing pads in the first row;
   wherein the first row is arranged between two second rows of the plurality of rows, and all of the sensing pads in the two second rows also stop receiving the trigger voltage.

7. The voltage sensing fingerprint recognition method according to claim 6, wherein the sensing pads stopped receiving the trigger voltage further receive an enhanced trigger voltage.

8. The voltage sensing fingerprint recognition method according to claim 7, wherein when the trigger voltage is stopped, the enhanced trigger voltage is received at the same time, and the voltage values of the trigger voltage and the enhanced trigger voltage are positive and negative oppositely.

9. A voltage sensing fingerprint recognition device, comprising:
   a substrate;
   a sensor arranged on the substrate, the sensor including a plurality of sensing pads, the sensing pads respectively arranged in a plurality of rows, and each row having at least two sensing pads, each of sensing pads synchronously or asynchronously receiving a trigger voltage and an enhanced trigger voltage; and
   a voltage receiver, electrically connected to each sensing pad;
   wherein when the voltage receiver captures a sensing voltage value of the sensing pads in a first row of the plurality of rows, all of the sensing pads in the first row stop receiving the trigger voltage and receive the enhanced trigger voltage, the first row is arranged between two second rows of the plurality of rows, and all of the sensing pads in the two second rows also stop receiving the trigger voltage; when the receiver captures another sensing voltage value of the sensing pads in the first row, the sensing pads in the first row receive the trigger voltage and stop receiving or receiving the enhanced trigger voltage.

* * * * *